United States Patent
Heitplatz et al.

(10) Patent No.: US 10,336,556 B2
(45) Date of Patent: Jul. 2, 2019

(54) CONVEYING DEVICE TO BRING TOGETHER INDIVIDUAL PACKAGES FROM SEVERAL TRANSFER CONVEYORS

(71) Applicant: BEUMER Group GmbH & Co. KG, Beckum (DE)

(72) Inventors: Heino Heitplatz, Drensteinfurt (DE); Ludger Pölling, Wadersloh-Diestedde (DE)

(73) Assignee: BEUMER Group GmbH & Co. KG, Beckum (DE)

( * ) Notice: Subject to any disclaimer, the term of this patent is extended or adjusted under 35 U.S.C. 154(b) by 0 days.

(21) Appl. No.: 15/933,788

(22) Filed: Mar. 23, 2018

(65) Prior Publication Data
US 2018/0273309 A1 Sep. 27, 2018

(30) Foreign Application Priority Data
Mar. 27, 2017 (EP) ..................................... 17163072

(51) Int. Cl.
*B65G 47/68* (2006.01)
*B65G 21/20* (2006.01)

(52) U.S. Cl.
CPC ....... *B65G 47/681* (2013.01); *B65G 21/2054* (2013.01); *B65G 2047/689* (2013.01)

(58) Field of Classification Search
CPC .................................................. B65G 47/68
(Continued)

(56) References Cited

U.S. PATENT DOCUMENTS 4,054,201 A 10/1977 Rollinger
5,174,430 A * 12/1992 Ebira ................... B65G 47/648
198/418.5

(Continued)

FOREIGN PATENT DOCUMENTS

DE 102007034519 1/2009
EP 0495261 7/1992

(Continued)

OTHER PUBLICATIONS

European Search Report for European Patent No. 17163072, dated Oct. 3, 2017, 2 pages.

*Primary Examiner* — Douglas A Hess
(74) *Attorney, Agent, or Firm* — Ganz Pollard, LLC

(57) ABSTRACT

Conveying device to bring together individual packages from at least one transfer conveyor onto a discharge conveyor, comprising an aligning conveyor having a receiving end, which a feeding end or feeding ends arranged next to each other of the transfer conveyor or transfer conveyors join, and a feeding end arranged parallel to the receiving end, which a receiving end of the discharge conveyor joins, wherein a guide element having a guide surface, arranged vertically to and directly over a conveying surface of the aligning conveyor, is located between a first external side edge of the transfer conveyor or a first transfer conveyor and an opposite first side edge of the discharge conveyor, a conveying direction of the aligning conveyor having a longitudinal component, which is directed from the transfer conveyor or first transfer conveyor to the discharge conveyor and with the conveying direction forms an angle, and having a transverse component directed against the guide element.

12 Claims, 6 Drawing Sheets

(58) Field of Classification Search
USPC ......... 198/369.1, 370.1, 436, 442, 598, 890
See application file for complete search history.

(56) References Cited

U.S. PATENT DOCUMENTS

| | | | | | |
|---|---|---|---|---|---|
| 5,195,627 | A | * | 3/1993 | Wyman | ................ B65G 47/086 198/374 |
| 5,988,356 | A | * | 11/1999 | Bonnet | ................ B65G 47/766 198/369.5 |
| 6,334,525 | B1 | * | 1/2002 | Collins | ................. B65G 17/26 198/442 |
| 6,810,645 | B2 | * | 11/2004 | Cerf | ....................... B65G 47/71 53/154 |
| 6,974,020 | B1 | * | 12/2005 | Peppel | ................. B65G 47/493 198/370.07 |
| 7,055,672 | B2 | * | 6/2006 | Holmgren | ............ B65G 47/244 198/444 |
| 7,165,667 | B2 | * | 1/2007 | Bocker | .................. B08B 9/205 198/442 |
| 7,306,087 | B1 | * | 12/2007 | Hamsten | .............. B65G 47/682 198/369.5 |
| 7,416,072 | B2 | * | 8/2008 | Gosset | ................. B65G 47/715 198/429 |
| 7,658,274 | B2 | * | 2/2010 | Mignano | ................ B65G 47/71 198/353 |
| 7,942,255 | B2 | * | 5/2011 | Seger | ................... B65G 47/682 198/442 |
| 8,100,252 | B2 | * | 1/2012 | Fourney | ................ B65G 47/22 198/444 |
| 9,714,144 | B2 | * | 7/2017 | Earling | ................ B65G 47/684 |
| 2005/0269186 | A1 | | 12/2005 | Yoda | |

FOREIGN PATENT DOCUMENTS

| | | |
|---|---|---|
| EP | 0885664 | 12/1998 |
| FR | 2832654 | 5/2003 |
| GB | 2114521 | 8/1983 |
| GB | 1110794 | 4/1986 |
| WO | 2011112449 | 9/2011 |
| WO | 2016082950 | 6/2016 |

* cited by examiner

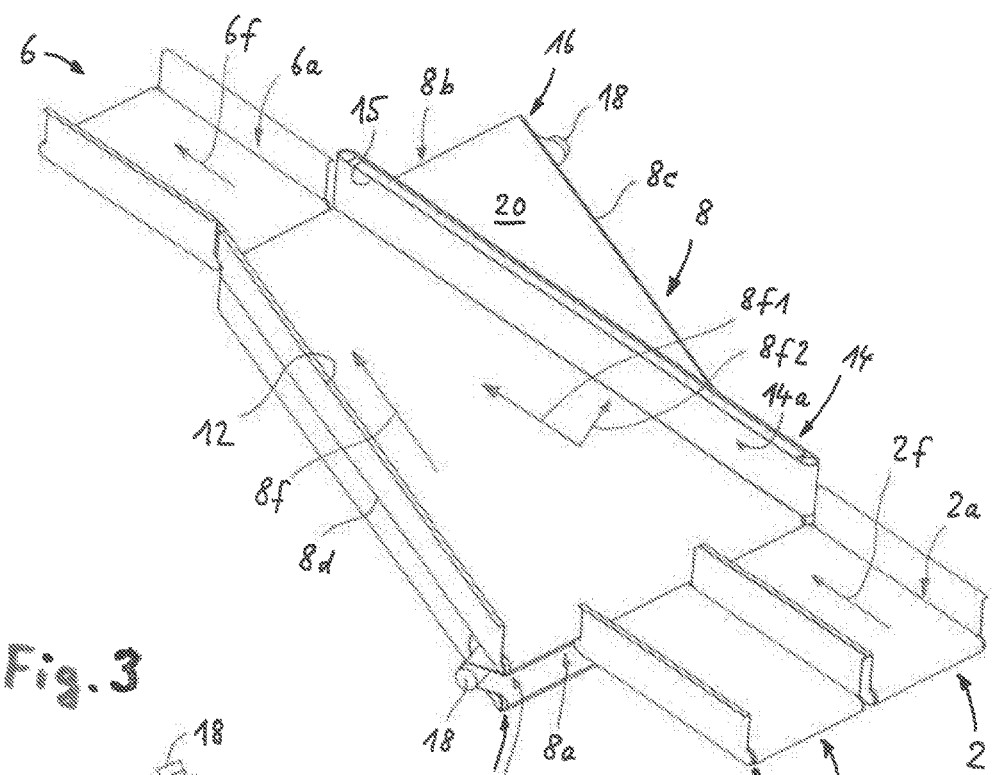
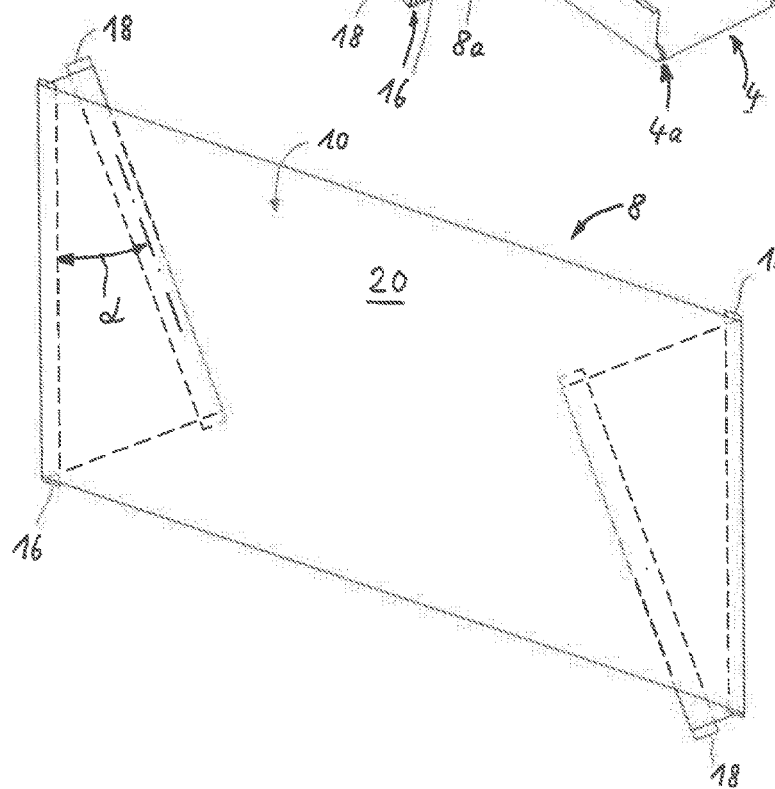

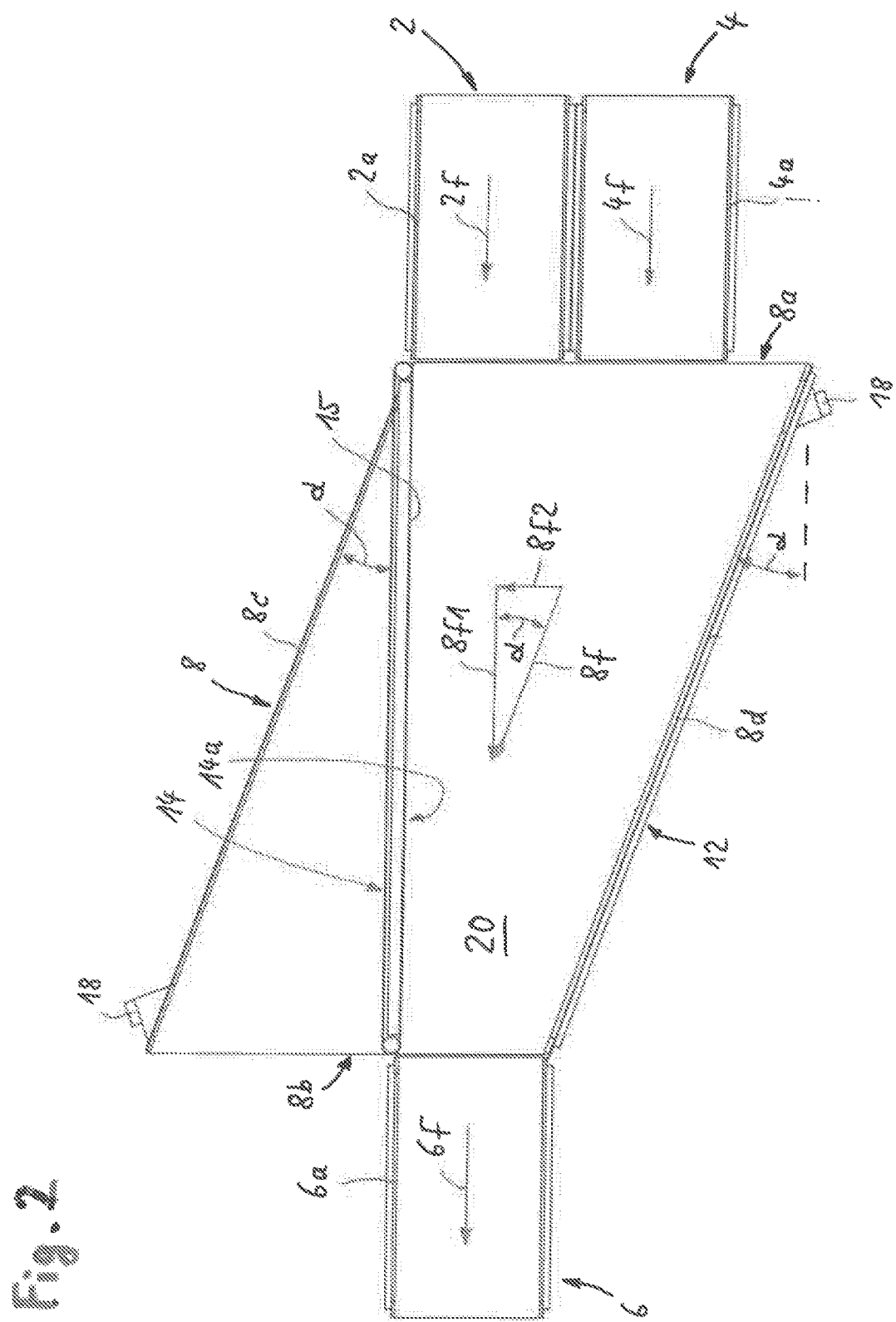

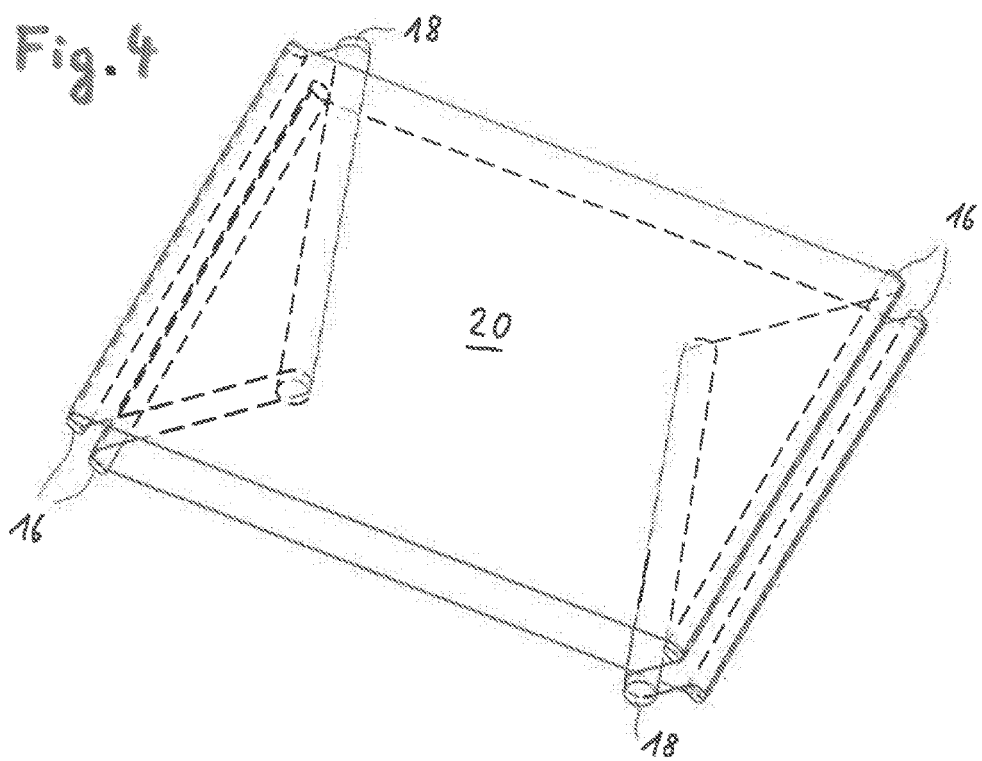
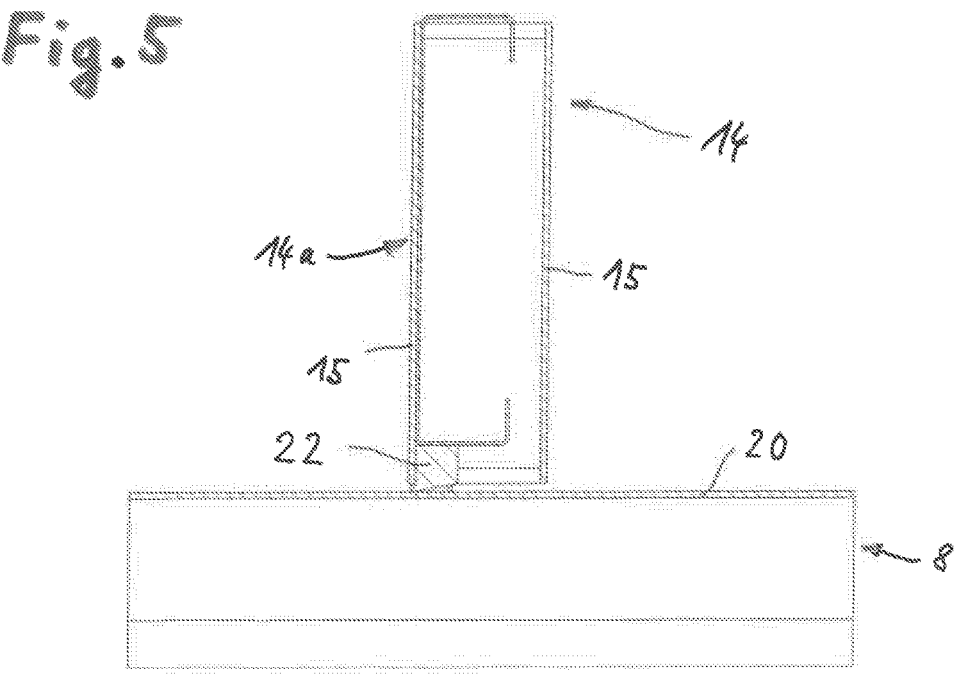

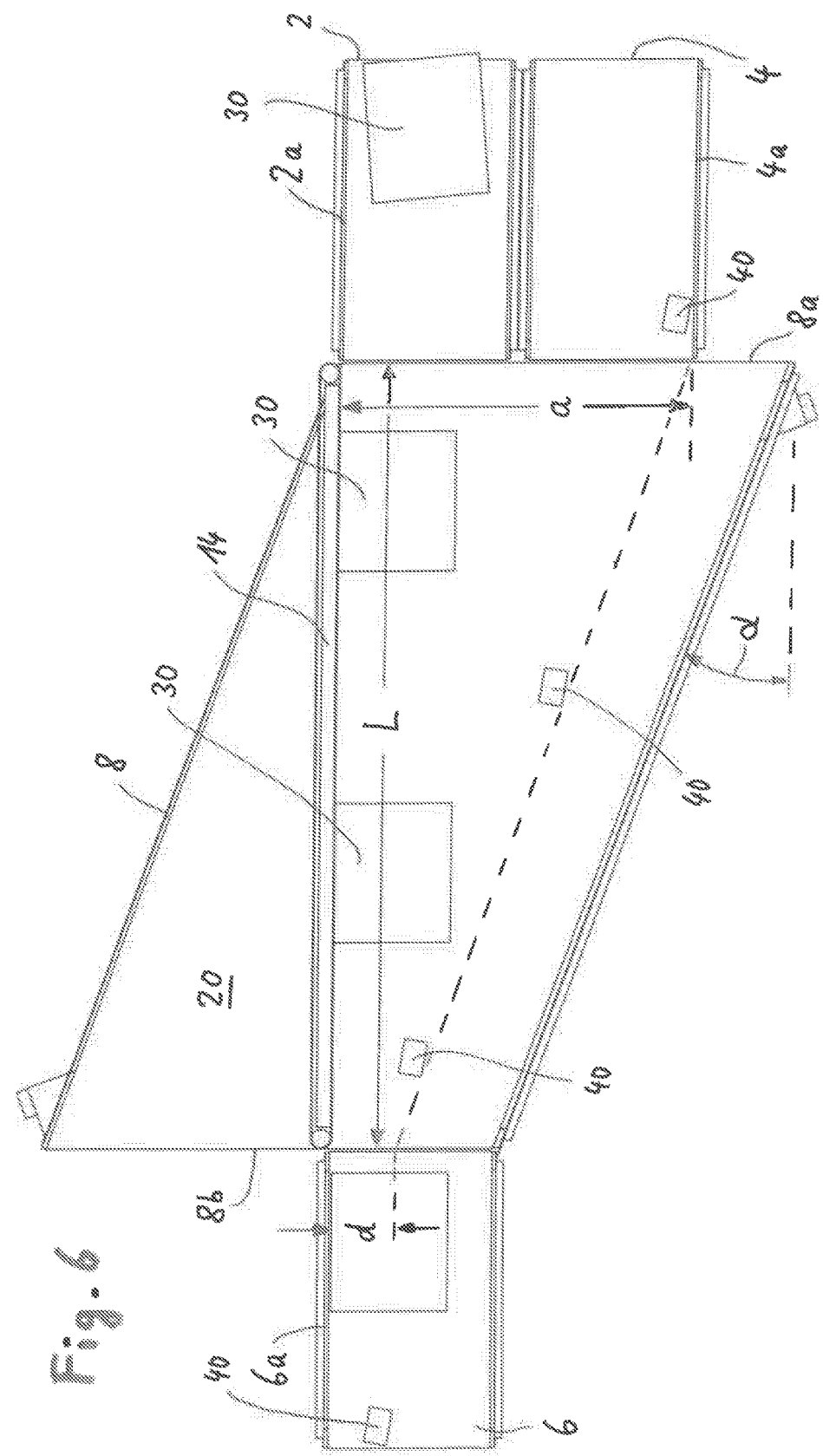

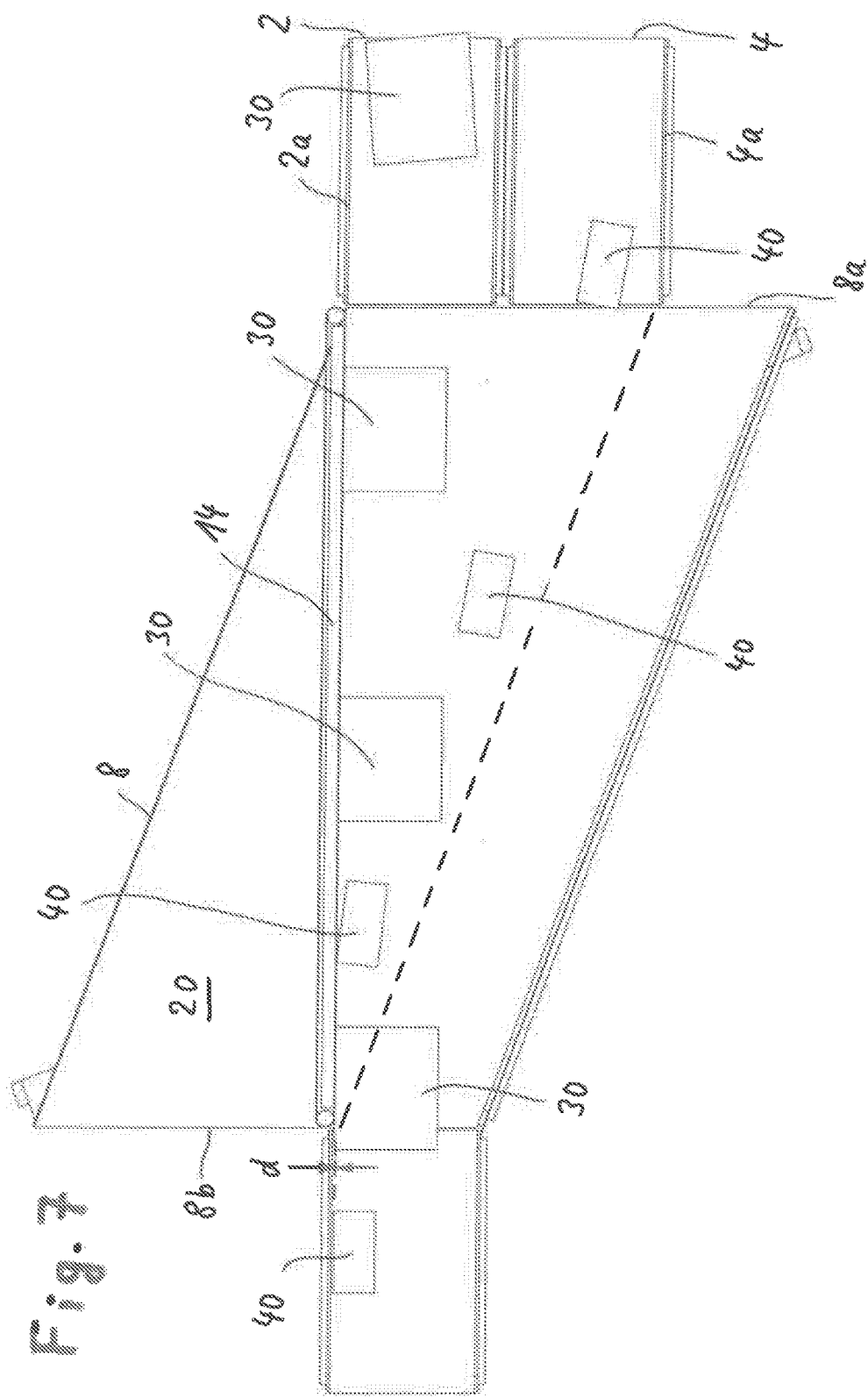

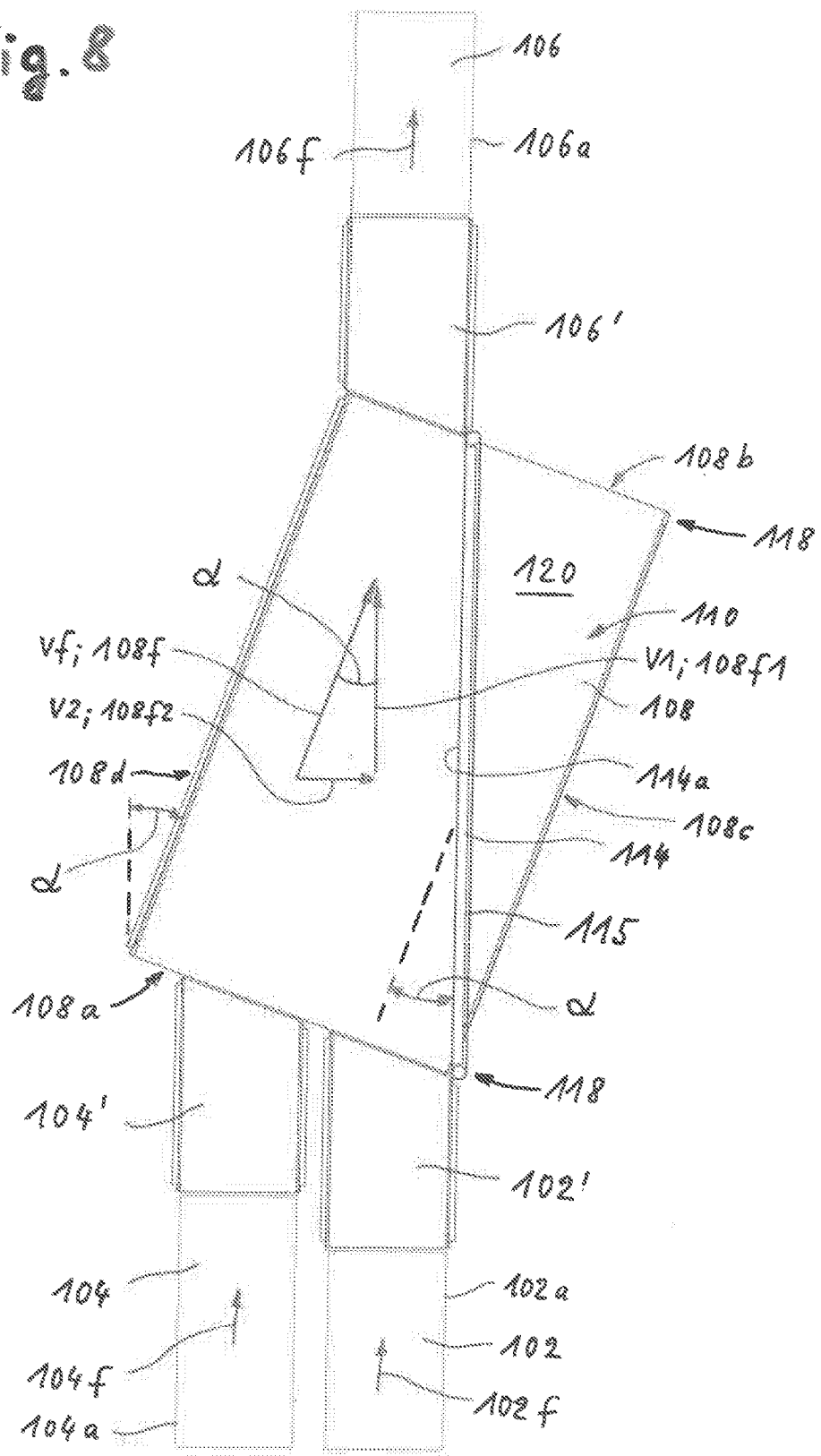

CONVEYING DEVICE TO BRING TOGETHER INDIVIDUAL PACKAGES FROM SEVERAL TRANSFER CONVEYORS

BACKGROUND

The invention relates to a conveying device to bring together individual packages from at least one transfer conveyor onto a discharge conveyor, as it is disclosed for example in GB 2 114 521 A, U.S. Pat No. 4,054,201 or also DE 10 2007 034 519 A1.

In the case of prior-art conveying devices the individual packages move from two transfer conveyors on parallel spaced-apart tracks onto a broader aligning conveyor, on which they are urged together onto a narrower track by means of a guide element or guide conveyor arranged diagonally to the conveying direction of the aligning conveyor and at the end of the aligning conveyor are taken over by a discharge conveyor.

Such an arrangement at higher conveying speeds is associated with the disadvantage that the individual packages, arriving on the transfer conveyors at sometimes substantial relative velocities, bump against the guide element and/or the guide conveyor, which can lead to damage.

SUMMARY

The invention is aimed at improving a prior-art conveying device with the effect that such bumping cannot take place.

To achieve this aim the invention proposes a conveying device to bring together individual packages from at least one transfer conveyor onto a discharge conveyor, comprising an aligning conveyor having a receiving end, which a feeding end or feeding ends arranged next to each other of the transfer conveyor or transfer conveyors join, and a feeding end arranged parallel to the receiving end, which a receiving end of the discharge conveyor joins, wherein a guide element having a guide surface, arranged vertically to and directly over a conveying surface of the aligning conveyor, is located between a first external side edge of the transfer conveyor or a first transfer conveyor and an opposite first side edge of the discharge conveyor, a conveying direction of the aligning conveyor having a longitudinal component, which is directed from the transfer conveyor or first transfer conveyor to the discharge conveyor and with the conveying direction forms an angle $\alpha$, and having a transverse component directed perpendicularly against the guide element.

The aligning conveyor preferably has a parallelogram-shaped conveying surface, wherein the angle $\alpha$ amounts to less than 90° and the feeding end is parallel and transversely offset to the receiving end. The conveying direction here runs at the angle $\alpha$ to the receiving- and feeding ends. Preferably the receiving end directly joins the feeding end of the transfer conveyor or feeding ends of the transfer conveyors, wherein the receiving end is expediently parallel to the feeding end or feeding ends of the transfer conveyor or transfer conveyors. Preferably the conveying direction of the aligning conveyor runs parallel to side edges, which extend between terminals of the receiving- and feeding ends.

The guide element is preferably formed as upright conveyor, wherein the guide surface is then designed as conveying surface and the upright conveyor can be a sliding conveyor, for instance a sliding metal panel, roller conveyor or belt- or strap conveyor, which is motorised. In particular the upright conveyor can be driven at a conveying speed, which is identical to a longitudinal speed component of the aligning conveyor directed from the receiving end to the feeding end and transverse thereto.

The guide surface and/or conveying surface of the upright conveyor is expediently arranged in a plane, which runs perpendicularly to the conveying surface of the aligning conveyor.

The angle $\alpha$ can amount to preferably between 3° and 45°, particularly between 10° and 30°.

Although in many cases two transfer conveyors are present, only one or three, four or more of these can be provided. Preferably it is proposed that the transfer conveyors are arranged directly adjacent to each other and their conveying directions are parallel.

Preferably the external first side edge of the transfer conveyor or first transfer conveyor, which is aligned with the guide element and/or upright conveyor, is parallel to the opposite first side edge of the discharge conveyor. In particular a conveying direction of the transfer conveyor or first transfer conveyor can be parallel to the conveying direction of the discharge conveyor and in a preferred embodiment the first external side edge of the transfer conveyor or first transfer conveyor and the first side edge of the discharge conveyor run in a plane, along which the guide surface extends. Whenever the transfer conveyor, the discharge conveyor and the guide element extend along one direction, or in other words, whenever the particular external side edges of the transfer conveyor or of the first transfer conveyor and the discharge conveyor extend in the plane, along which the guide surface also extends, a small slip of the individual packages is to be expected, since all conveyors can have the same speed vector along the conveying direction, i.e. towards the transfer- and discharge conveyors.

A second external side edge of the transfer conveyor or a transfer conveyor, furthest away from the guide element and/or upright conveyor, can have a distance a to the upright conveyor, for which $a = L \cdot \tan \alpha$ is valid, wherein L is the distance of the receiving end before the feeding end of the aligning conveyor. A length of the guide element or upright conveyor can also be identical to this distance L. In the case of such an arrangement it is ensured that an individual package, which is fed to the aligning conveyor along a movement track on the transfer conveyor or a transfer conveyor, furthest away from the upright conveyor, still comes into contact with the guide surface and/or upright conveyor and is aligned thereby.

The said stipulation can be modified e.g. under consideration to a minimum width or length dimension of an individual package with the effect that a second external side edge of the transfer conveyor or the transfer conveyor, furthest away from the upright conveyor, can have a distance a to the upright conveyor, for which $a = (L \cdot \tan \alpha + d)$ is valid, wherein d is a pre-determined measurement, for instance a minimum horizontal dimension such as width or length of an individual package being transported.

It may be proposed that two parallel, spaced-apart fixed deflection profiles are placed at the receiving end of the aligning conveyor, between which a drive- or guide roller arranged at the angle a thereto is located.

Accordingly two parallel, spaced-apart fixed deflection profiles can be located at the feeding end of the aligning conveyor, between which a drive- or guide roller arranged at the angle $\alpha$ thereto is located.

The upright conveyor can have a series of rollers arranged perpendicularly to the conveying surface of the aligning conveyor or an endlessly rotating conveyor belt. In the latter case it can have a belt support arranged on a lower edge directly adjacent to the conveying surface of the aligning conveyor.

A fixed side wall may be arranged on a side edge of the aligning conveyor opposite the upright conveyor. In an alternative embodiment the aligning conveyor can have a rectangular conveying surface, wherein the receiving end joins a feeding end or feeding ends arranged next to each other of the transfer conveyor or transfer conveyors, and the feeding end joins a receiving end of the discharge conveyor. Expediently the transfer conveyor or transfer conveyors are formed as trapezoidal transition conveyors or comprise these, wherein a conveying direction of the transfer conveyor or transfer conveyors can be parallel to a conveying direction of the discharge conveyor and to the longitudinal component of the aligning conveyor.

BRIEF DESCRIPTION OF THE DRAWINGS

The invention is described below on the basis of an exemplary embodiment, reference being made to a drawing wherein FIG. 1 shows a perspective view of an inventive conveying device to bring together individual packages from two transfer conveyors onto a discharge conveyor, FIG. 2 shows a top view onto the conveying device in FIG. 1, FIG. 3 shows a schematic top view onto the aligning conveyor, FIG. 4 shows a perspective schematic view of the aligning conveyor, FIG. 5 shows a cross-sectional view of the upright conveyor, FIG. 6 describes the functioning of the conveying device on the basis of a first embodiment, FIG. 7 describes the functioning of the conveying device on the basis of a second embodiment and FIG. 8 describes an alternative embodiment of the invention.

DETAILED DESCRIPTION

The exemplary embodiment described in FIGS. 1 to 4 shows a conveying device to bring together individual packages from two parallel first and second transfer conveyors 2, 4 onto a discharge conveyor 6, comprising a parallelogram-shaped aligning conveyor 8 arranged therebetween. Transfer conveyors 2, 4 and discharge conveyor 6 are preferably formed as belt conveyors but alternatively can be roller- or sliding conveyors.

Aligning conveyor 8 is illustrated in detail on FIGS. 3 and 4 and has a conveying surface 10, which is parallelogram-shaped when viewed from above and extends between a straight-line receiving end 8a, straight-line feeding end 8b parallel and transversely offset thereto, and between side edges 8c and 8d running parallel to each other, wherein a first side edge 8c runs adjacent to first transfer conveyor 2 and joins a first external side edge 2a of this transfer conveyor 2. A lateral delimitation is arranged on a second side edge 8d of aligning conveyor 8 in the form of a fixed side wall 12.

A guide element 14, which in the illustrated embodiment is formed as upright conveyor with an endlessly rotating conveyor belt 15, extends between said first external side edge 2a of first transfer conveyor 2 and a first side edge 6a of discharge conveyor 6, wherein in this embodiment first side edge 2a of transfer conveyor 2 runs in a line with guide element 14 and first side edge 6a of the discharge conveyor. A conveying direction 2f of first transfer conveyor 2 runs parallel to a conveying direction 6f of discharge conveyor 6 and corresponds to a longitudinal component 8/1 of conveying direction 8f of aligning conveyor 8, which runs parallel to its side edges 8c, 8d. The same is valid for a conveying direction 4f of second transfer conveyor 4. Guide element 14 has a guide- or conveying surface 14a, which extends in a plane perpendicular to conveying surface 10.

During operation of the conveying device the respective conveying speeds are preferably adjusted so that transfer conveyors 2, 4 and discharge conveyor 6 work at identical conveying speeds v1, while a longitudinal speed component v1 in the direction of longitudinal component 8/1 of aligning conveyor 8 is expediently identical to this conveying speed v1. Then all conveyors have a same speed vector in the longitudinal direction. Due to the diagonal arrangement of the aligning conveyor and its conveying direction in respect to guide element and/or upright conveyor 14, conveying direction 8f of aligning conveyor 8 possesses a transverse component 8/2, which is directed perpendicularly against guide element 14. Transverse speed component v2 of aligning conveyor 8 is thus shown via the angle α as v2=v1·tan α or v2=vf·sin α with vf as conveying speed of the aligning conveyor in conveying direction 8f.

The structure of aligning conveyor 8 is shown on FIGS. 3 and 4. Two fixed deflection profiles 16, which face each other when the aligning conveyor is arranged horizontally spaced-apart in the vertical direction, are located in each case within the vicinity of receiving- and feeding ends 8a, 8b. Drive- and/or guide rollers or idlers 18, over which an endlessly rotating conveyor belt 20 passes, are arranged therebetween at the pre-determined angle α. Static friction exists between conveyor belt 20 and drive- or guide rollers 18, while sliding friction prevails between fixed deflection profiles 16 and conveyor belt 20.

FIG. 5 describes a characteristic with regard to the guide element or upright conveyor 14. Since the upright conveyor should not directly rest on conveyor belt 20 of aligning conveyor 8, a belt support 22 with a special edge profile is provided between endlessly rotating conveyor belt 15 of upright conveyor 14 and conveyor belt 20 of the aligning conveyor, by which it is possible that particularly flat individual packages or components of these, as for example tapes, bands, parts of bags etc. are prevented from coming between upright conveyor 14 and aligning conveyor 8 due to the transverse component of aligning conveyor 8.

FIGS. 6 and 7 describe the functioning of the invention on the basis of two embodiments. FIG. 6 describes the functioning on the basis of a first embodiment, in which two transfer conveyors 2, 4 join receiving end 8a of aligning conveyor 8 and discharge conveyor 6 joins feeding end 8b of aligning conveyor 8. Upright conveyor 14 runs in one direction and along a straight line with first external side edge 2a of first transfer conveyor 2 and with opposite first side edge 6a of discharge conveyor 6. A distance a of a second external side edge 4a of transfer conveyor 4, furthest away from upright conveyor and/or guide element 14, to upright conveyor 14 is selected so that a=(L·tan α+d) is valid, wherein d is a certain pre-determined measurement. Thus it is ensured that even relatively small individual packages still come into contact with upright conveyor 14 before being transferred to discharge conveyor 6 and experience an alignment effect.

FIG. 7 shows an embodiment, which corresponds to FIG. 6, with the difference that said measurement d is selected so as to be less than in FIG. 6, with identical angle α and identical length L of the upright conveyor, wherein a value d of practically 0 was used as the basis. In other words the device according to FIG. 7 is also able to reliably align very small individual packages 40, which are transported near outer side edge 4a of transfer conveyor 4, further and/or furthest away from upright conveyor 14. For d=0 the equation a=L·tan α is valid.

Individual packages 30 transported on first transfer conveyor 2 are shown to automatically come into contact with upright conveyor 14 in every case irrespective of their size.

FIG. 8 shows a somewhat different embodiment wherein the difference, compared to the first embodiment, consists in that aligning conveyor 108 does not have a parallelogram-shaped but rectangular conveying surface 110 and can be formed as a conventional belt- or roller conveyor, conveying direction 108f of which runs perpendicularly to receiving- and feeding ends 108a, 108b and parallel to side edges 108c, 108d of aligning conveyor 108. A guide element 114, which in this embodiment is also formed as upright conveyor with an endlessly rotating conveyor belt 115, has a guide- or conveying surface 114a, which extends in a plane, which is arranged perpendicularly to conveying surface 110 of aligning conveyor 108.

Aligning conveyor 108 is expediently designed as belt conveyor with a conveyor belt 120, which rotates endlessly around drive- and guide rollers 118, arranged at receiving- and feeding ends 108a, 108b parallel to one another in each case.

The plane, along which conveying surface 114a of guide element 114 extends, is arranged diagonally to conveying direction 108f of aligning conveyor 108 at said angle α. Thus conveying direction 108f of aligning conveyor 108 possesses a longitudinal component 108f1 parallel to said plane of conveying surface 114a of guide element 114 and a transverse component 108f2 directed perpendicularly thereto. In the same way a conveying speed vf of aligning conveyor 108 possesses a longitudinal component v1 and a transverse component v2.

Two parallel first and second transfer conveyors 102, 104 with parallel conveying directions 102f, 104f serve to feed individual packages onto aligning conveyor 108, wherein conveying directions 102f, 104f of the transfer conveyors are parallel to longitudinal component 108f1 of aligning conveyor 108. Since transfer conveyors 102, 104 have a rectangular conveying surface, comprising a feeding end which is arranged perpendicularly to the respective conveying direction 102f, 104f of the transfer conveyor 102, 104 concerned, transition conveyors 102⟍, 104⟍, which have a trapezoidal conveying surface in each case, are provided to bridge the otherwise existing gap. Transition conveyors 102⟍, 104⟍ can be formed for example as belt conveyors with several narrow conveyors of different length arranged next to each other or, just like the illustration, as roller conveyors with a trapezoidal surface area and rollers arranged differently, transverse to the conveying direction or, just like the illustration, as conveyors with a trapezoidal conveying surface, the feeding end of which arranged diagonally to the conveying direction is formed by a transverse deflection and a guide roller arranged diagonally (not illustrated), similarly to the structure of aligning conveyor 8 described in FIG. 3.

Discharge conveyor 106 joins feeding end 108b of aligning conveyor 108, conveying direction 106f of which is parallel to longitudinal component 108f1 of aligning conveyor 108 and to conveying direction 102f, 104f of the transfer conveyors. A transition conveyor 106⟍, the conveying surface of which is trapezoidal, is also provided here and which can be formed as the transition conveyors arranged similarly to the transfer conveyors.

A first external side edge 102a of the first transfer conveyor is parallel and/or in a line with a first side edge 106a of discharge conveyor 106, and expediently in the plane, along which conveying surface 114a of upright conveyor 114 extends.

A second external side edge 104a of second transfer conveyor 104 has a distance a to conveying surface 114a of upright conveyor 114, for which a=L·tan α+d is valid, wherein L is a length of upright conveyor 114 and d is a certain pre-determined measurement, which in a specific case can be 0.

The invention claimed is:

1. The conveying device to bring together individual packages from at least one transfer conveyor onto a discharge conveyor, comprising an aligning conveyor having a receiving end, which a feeding end or feeding ends arranged next to each other of the transfer conveyor or transfer conveyors join, and a feeding end arranged parallel to the receiving end, which the receiving end of the discharge conveyor joins, wherein a guide element having a guide surface, arranged vertically to and directly over a conveying surface of the aligning conveyor, is located between a first external side edge of the transfer conveyor or a first transfer conveyor and an opposite first side edge of the discharge conveyor, a conveying direction of the aligning conveyor having a longitudinal component, which is directed from the transfer conveyor or first transfer conveyor to the discharge conveyor and with the conveying direction forms an angle (α), and having a transverse component directed perpendicularly against the guide element; and
    wherein the aligning conveyor has a parallelogram-shaped conveying surface, wherein the angle (α) amounts to less than 90° and the feeding end is parallel and transversely offset to the receiving end.

2. The conveying device according to claim 1, wherein the guide surface of the guide element is arranged in a plane running perpendicularly to the conveying surface of the aligning conveyor.

3. The conveying device according to claim 1, wherein the guide element is formed as an upright conveyor, wherein the guide surface is designed as conveying surface and the upright conveyor can be a sliding conveyor, roller conveyor or belt- or strap conveyor, which can be motorised.

4. The conveying device according to claim 3, wherein the upright conveyor can be driven at a conveying speed, which is identical to the longitudinal speed component of the aligning conveyor directed towards the longitudinal component of the conveying direction of the aligning conveyor.

5. The conveying device according to claim 3, wherein the upright conveyor has an endlessly rotating conveyor belt and has a belt support arranged on a lower edge directly adjacent to the conveying surface of the aligning conveyor.

6. The conveying device according to claim 1, wherein the angle (α) amounts to between 3° and 45°, particularly between 10° and 30°.

7. The conveying device according to claim 1, wherein the first side edge of the first transfer conveyor is parallel to the opposite first side edge of the discharge conveyor.

8. The conveying device according to claim 1, wherein the first external side edge of the transfer conveyor or first transfer conveyor and the first side edge of the discharge conveyor run in a plane, along which the guide surface extends.

9. The conveying device according to claim 8, wherein a=L·tan α+d is valid, wherein d is a pre-determined measurement, for instance a minimum horizontal dimension of an individual package being transported.

10. The conveying device according to claim 1, wherein a second external side edge of the transfer conveyor or a transfer conveyor, furthest away from the guide element, has a distance (a) to the guide element, for which $a = L \cdot \tan \alpha$ is valid, wherein L is the distance of the receiving end to the feeding end of the aligning conveyor.

11. The conveying device according to claim 1, wherein two parallel fixed deflection profiles are arranged at the receiving end of the aligning conveyor, between which a drive- or guide roller for an endlessly rotating conveyor belt, arranged at the angle thereto, is located.

12. The conveying device according to claim 1, wherein two parallel fixed deflection profiles are arranged at the feeding end of the aligning conveyor, between which a drive or guide roller for an endlessly rotating conveyor belt, arranged at the angle thereto, is located.

* * * * *